(12) United States Patent
Edmiston et al.

(10) Patent No.: US 8,194,528 B2
(45) Date of Patent: Jun. 5, 2012

(54) PACKET BASED DATA CELL DELINEATION

(75) Inventors: Graham Edmiston, Glasgow (GB); Bo Lin, East Kilbride (GB)

(73) Assignee: Freescale Semiconductor, Inc., Austin, TX (US)

( * ) Notice: Subject to any disclaimer, the term of this patent is extended or adjusted under 35 U.S.C. 154(b) by 243 days.

(21) Appl. No.: 12/532,769

(22) PCT Filed: Mar. 26, 2007

(86) PCT No.: PCT/IB2007/051051
§ 371 (c)(1),
(2), (4) Date: Sep. 23, 2009

(87) PCT Pub. No.: WO2008/117128
PCT Pub. Date: Oct. 2, 2008

(65) Prior Publication Data
US 2010/0054280 A1 Mar. 4, 2010

(51) Int. Cl.
*H04L 12/26* (2006.01)
(52) U.S. Cl. .......................... 370/203; 370/252; 370/255
(58) Field of Classification Search .................. 370/203, 370/241, 252, 254, 255, 476
See application file for complete search history.

(56) References Cited

U.S. PATENT DOCUMENTS

| 5,600,653 | A | 2/1997 | Chitre |
| 5,768,274 | A | 6/1998 | Murakami et al. |
| 6,269,096 | B1 * | 7/2001 | Hann et al. ............ 370/366 |
| 6,845,139 | B2 * | 1/2005 | Gibbons ............ 377/47 |
| 2002/0141450 | A1 | 10/2002 | Duvvuru |
| 2003/0048803 | A1 | 3/2003 | Tsai et al. |

OTHER PUBLICATIONS

Chao H J et al: "A Photonic Front-End Processor in a WDM ATM Multicast Switch" Journal of Lightwave Technology, vol. 18 No. 3, Mar. 2000.
Bharat Doshi et al: "A Simple Data Link (SDL) Protocol for Next Generation Packet Network" IEEE Journal on Selected Areas in Communications, IEEE Service Center, Piscataway, US, vol. 18 No. 10, Oct. 2000.
International Search Report and Written Opinion correlating to PCT/IB2007/051051 dated Nov. 16, 2007.

* cited by examiner

*Primary Examiner* — Jianye Wu
*Assistant Examiner* — Mon Cheri Davenport

(57) ABSTRACT

A method of delineation of a packet-based data stream in order to identify a boundary between neighbouring packets in the data stream, wherein the data stream comprises a predetermined number of bits (N); the method comprising the steps of: processing the data stream to search for the boundary between neighbouring packets in the data stream; characterised in that the method further comprises calculating the greatest common divisor (GCD) of a bit skip integer (n) where (N) and (n) are co-primes; iteratively checking after each n bits to identify the boundary between the neighbouring packets.

20 Claims, 4 Drawing Sheets

1. Check for ATM cell boundary if found go to 3
2. Skip n bits go to 1
3. PRESYNC state of cell delineation state diagram (Figure 5 of ITU-T I.432.1)

PACKET BASED DATA CELL DELINEATION

FIELD OF THE INVENTION

This invention relates to improvements in or relating to packet based data cell delineation, particularly but not exclusively at the boundaries of ATM (asynchronous transfer mode) cell delineation.

BACKGROUND OF THE INVENTION

Software recognition of ATM cell boundaries, commonly known as ATM cell delineation, on an incoming serial data stream is a computationally intensive task. Typically a method such as that outlined in the ITU-T I.432.1 specification is required. In this multiple single bit shifts followed by a boundary check per shift are employed. The reason for delineating the cells is to allow the content of the cells to be decoded. If a given RISC processor is required to delineate a plurality of serial ATM cell streams the processing requirements for the delineation algorithm will leave little computational resource for other tasks. Furthermore, if the RISC processor is of low performance (i.e. a low number of instructions processed per second) it may not be possible to process a plurality of serial ATM cell streams on that engine. Similar problems can be encountered in any embodiment of data requiring delineation based on data integrity checking. As such the present invention is relevant to more than just ATM cell delineation.

US 2002/0141450 relates to a scheme for cell delineation in hardware. This method processes bytes received from the data stream in multiple parallel byte processing engines that process a first set of bytes during the first cycle and a second set of bytes during a second cycle.

U.S. Pat. No. 5,768,274 a shows a scheme for cell delineation in hardware. This patent discloses a cell multiplexer having time divisional multiplexed cell delineation functions.

US 2003/0048803 relates to another hardware method for cell delineation. This application discloses a transmission convergence sub layer circuit and operating method for an asynchronous receiver.

U.S. Pat. No. 6,269,096 relates to yet another hardware method of cell delineation. Here blocks are received and transmitted for ATM cell delineation. The received block has a plurality of cell delineation blocks which are selected by a bus controller in order to delineate the ATM cells.

None of the prior art relates to any software implementation of ATM cell delineation. Accordingly none of the prior appreciate the problems of ATM cell delineation in the software environment and certainly go nowhere to solving those problems.

SUMMARY OF THE INVENTION

The present invention provides a method and apparatus as described in the accompanying claims.

BRIEF DESCRIPTION OF THE DRAWINGS

Reference will now be made by way of example to the accompanying drawings, in which.

DETAILED DESCRIPTION OF THE PREFERRED EMBODIMENTS

Figure 1:
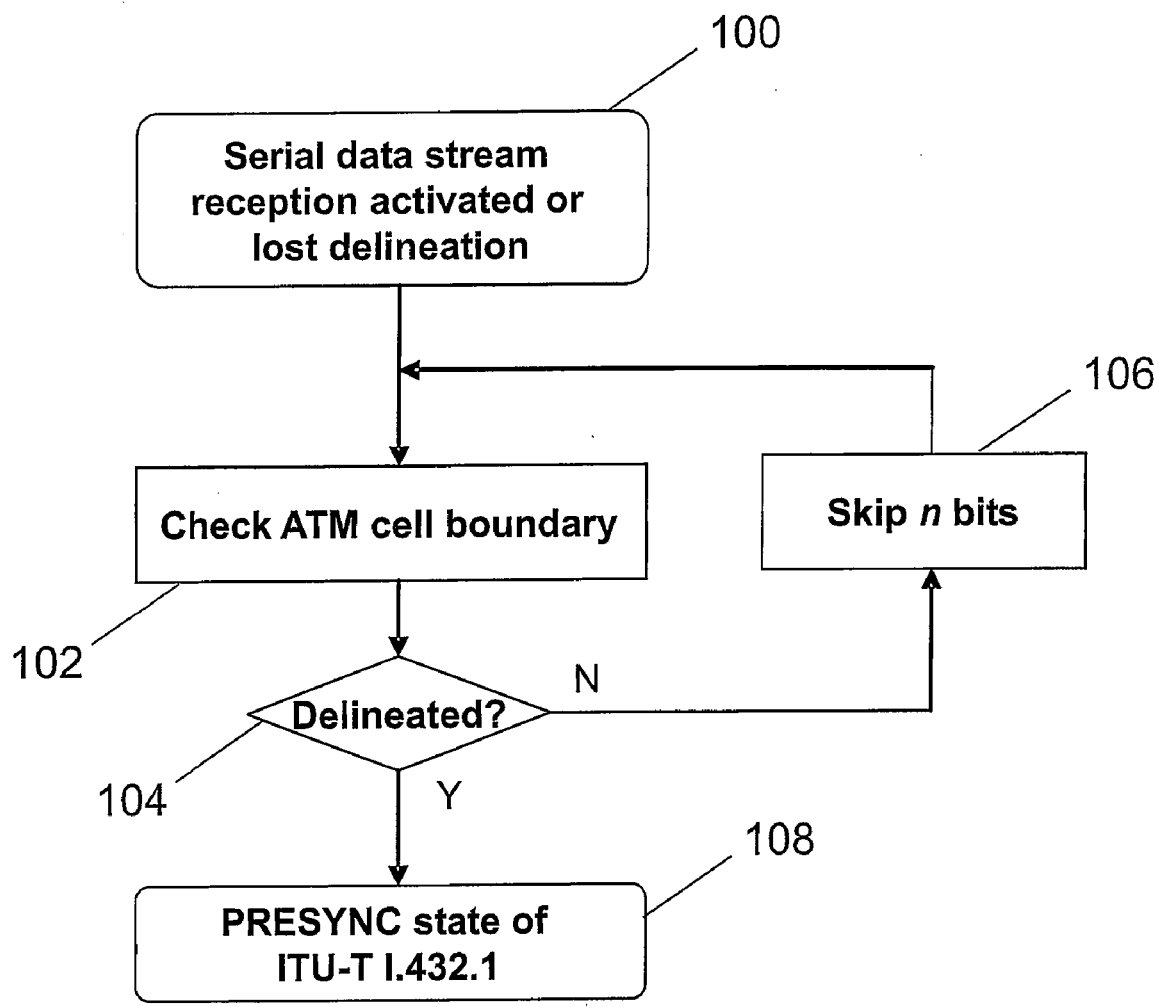
FIG. 1 is a flow chart of the method of ATM cell delineation in accordance with one embodiment of the invention, given by way of example.

Referring to FIG. 1 a flow chart of the present invention is shown. A serial data stream is received or experiences a loss in delineation 100. This commences a check 102 for the ATM cell boundary.

A determination is made as to whether the boundary has been found (step 104). If NO; n bits are skipped (step 106) and a new check 102 is carried out. This continues until step 102 results in a YES. If YES; a pre synchronisation state as defined in ITU-T I.432.1 (step 108) is achieved.

Figure 2:
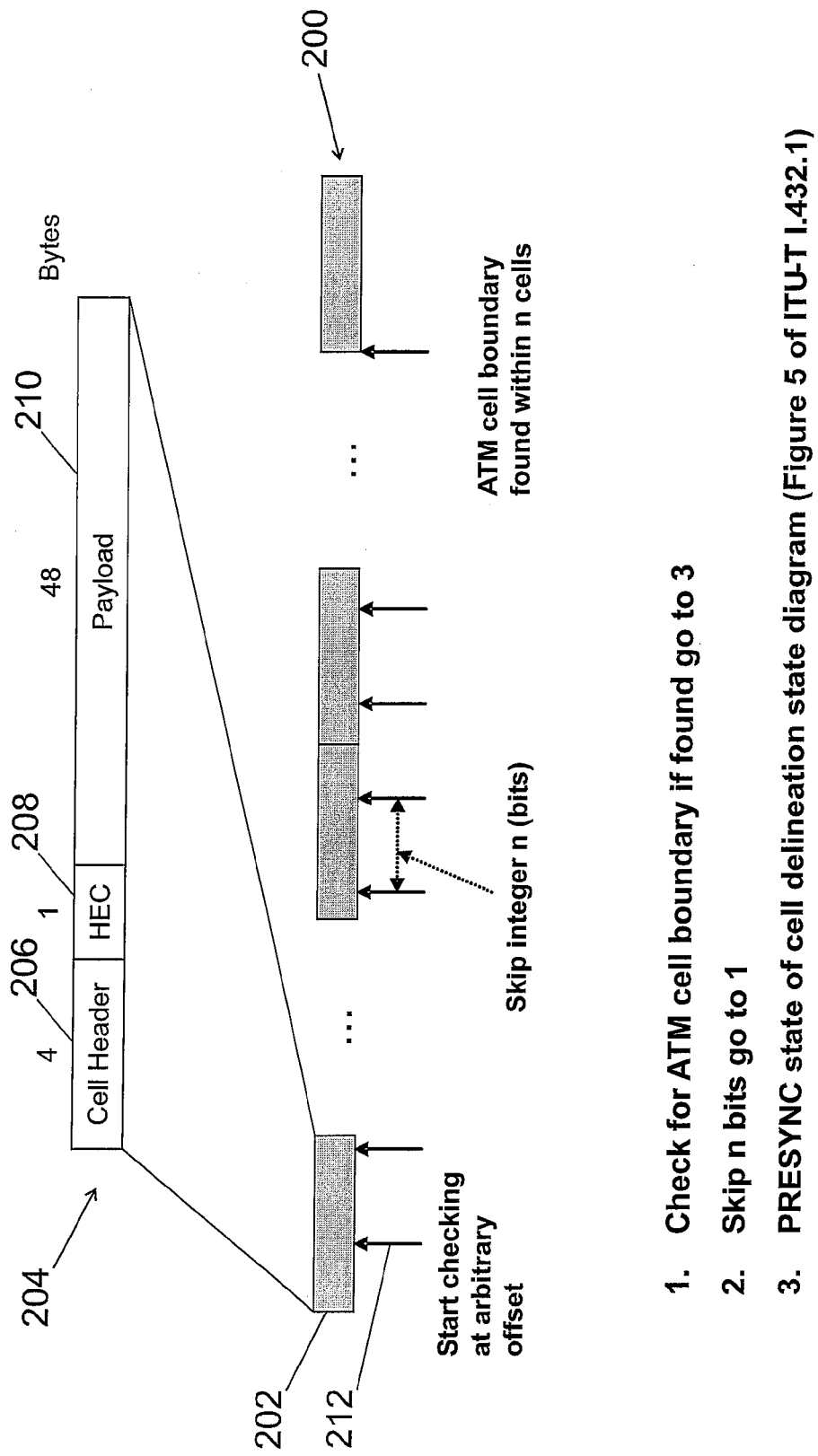
FIG. 2 is a diagram of an ATM cell to show the delineation process in accordance with one embodiment of the invention, given by way of example.

FIG. 2 shows a stream of ATM cells 200, each cell or packet is represented by a rectangle 202. One of the cells is shown in more detail at 204. The cell includes a header 206, a Header Error Control (HEC) element 208 and a payload 210. The check for the ATM boundary starts at an arbitrary offset (see 212) in accordance with the invention.

If the arbitrary offset is actually on the cell boundary the pre synchronisation state of cell delineation is arrived at immediately. However, generally the arbitrary offset will not be on the cell boundary at the first instance. Hence the next check is made n bits after the starting point.

A plurality of subsequent checks is then carried out until the cell boundary is found. The value of n is calculated (as will be described below) to be a specific value in order to optimise the speed in which the ATM stream is delineated. The maximum number of steps from the arbitrary offset will not exceed n, due to the algorithm used and described in greater detail below.

Figure 3:
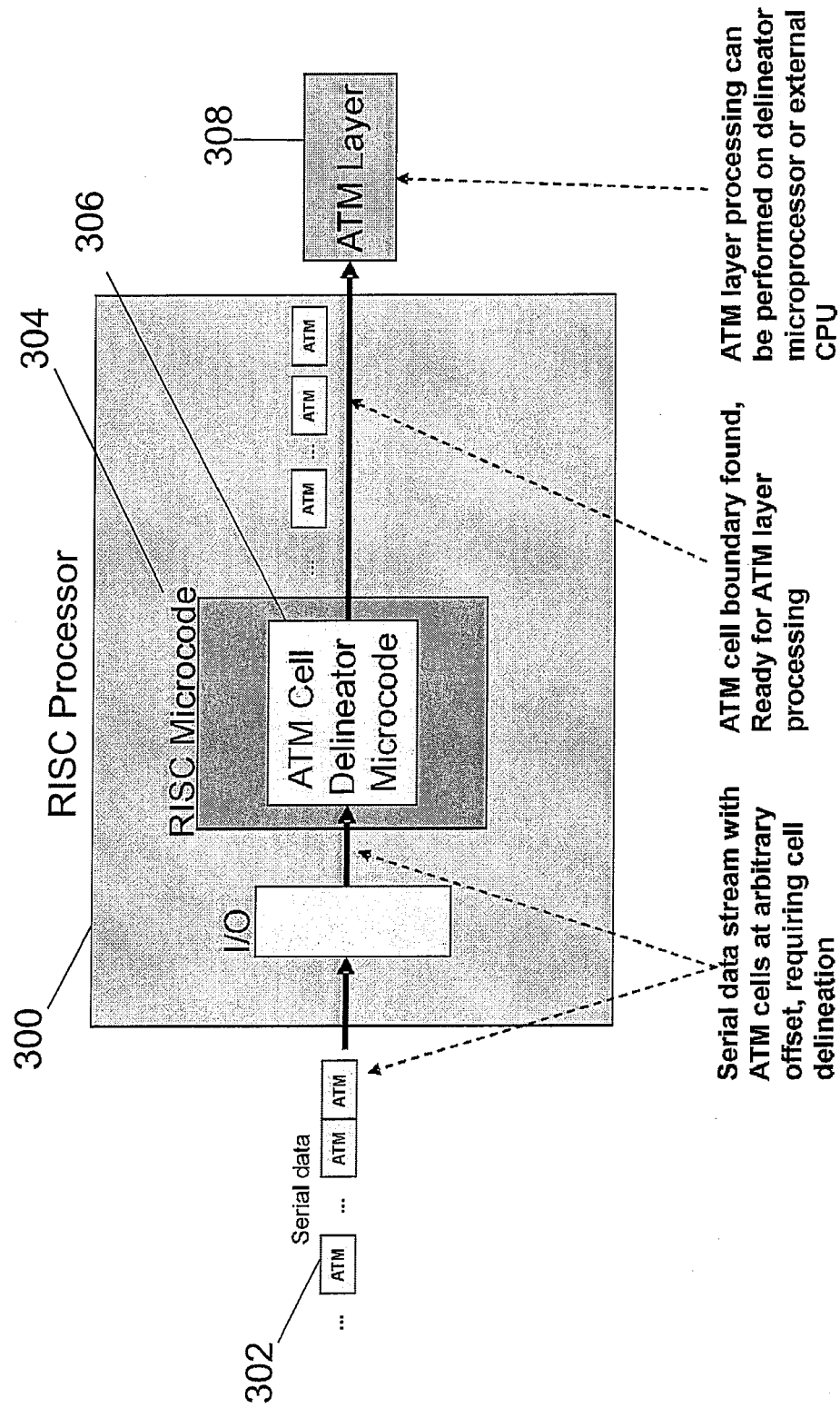
FIG. 3 is a diagram of a RISC Processor in accordance with one embodiment of the invention, given by way of example.

Referring now to FIG. 3 a block diagram of a possible circuit is shown. A RISC microprocessor 300 processes an ATM data stream 302. The RISC microcode 304 in the processor includes a ATM cell delineator microcode 306 which determines the ATM cell boundary as herein described. An ATM layer 308 can, then subsequently process the delineated ATM cells in an appropriate manner.

ATM cell boundaries can occur at any arbitrary bit position within an incoming serial data stream. The present invention applies an algorithm (as discussed above) to the cell delineation task. This is carried out by checking every nth bit from the start, where n is an integer; rather than checking bit by bit for the start of a cell boundary. As will be appreciated this allows the cell delineation task processing requirements to be mapped to the available cycles on any given RISC processor. This reduces the processing power required for any particular ATM data stream. As a result of the reduction in processing required for each individual serial ATM stream, the RISC processor can process a plurality of serial ATM streams and still have available processing power for other tasks. In the alternative any RISC processor with low performance could be used for delineation of a plurality of serial ATM streams thereby reducing the system cost.

The invention makes use of the mathematical principle of coprimality, which is applied to guarantee an ATM boundary will be found no matter what the starting position in the ATM stream. The calculation of the greatest common divisor (GCD) is exploited in order to obtain the optimal step size (ie the n value or number of bits skipped for a given RISC processor) before checking for cell delineation. In mathematics the integers a and b are said to be co-prime if they have no common factor other than 1 or −1, in other words if their greatest common divisor (GCD) is 1. The fact that two integers are co-prime can be calculated in a number of different manners, but the common manner is to use the Euclidean algorithm.

Figure 4:
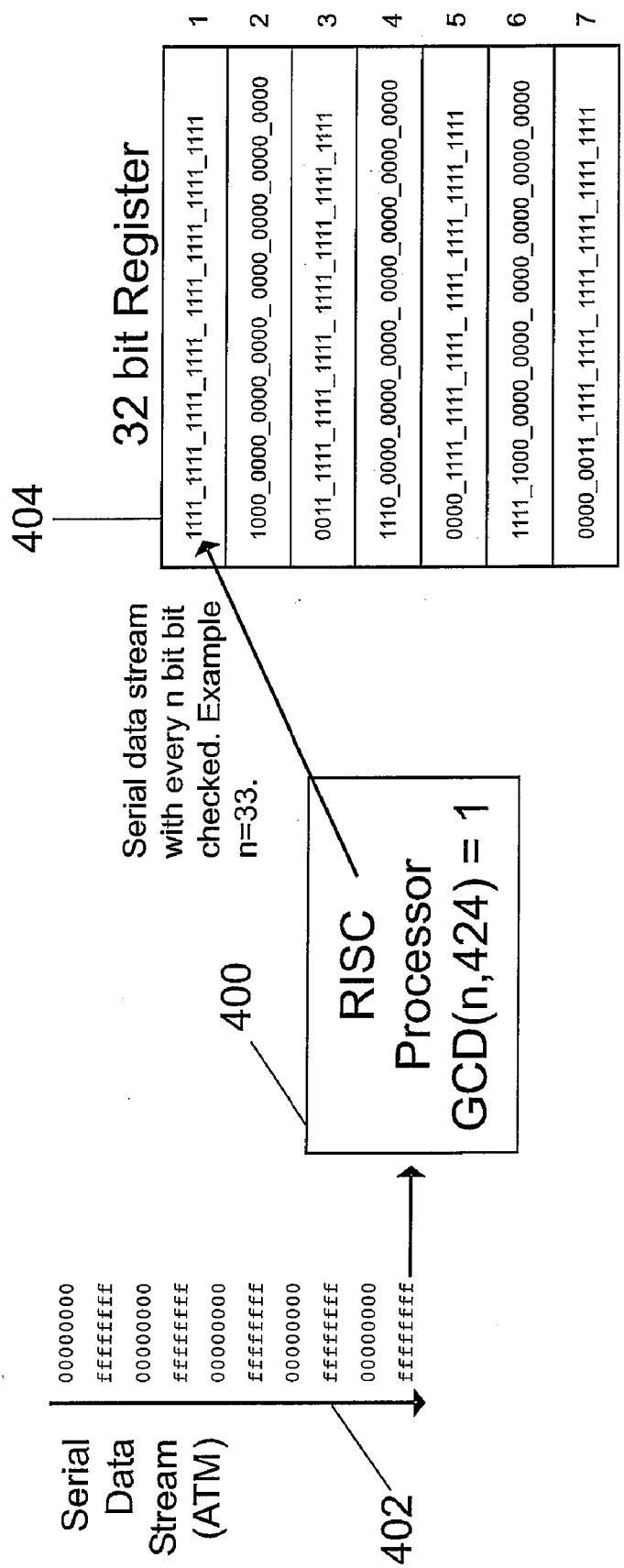
FIG. 4 is a schematic diagram showing the cell delineation scheme in accordance with one embodiment of the invention, given by way of example.

Referring to FIG. 4 a bit wise example of the process is shown. The RISC processor 400 contains a 32 bit register 404. During link establishment the RISC processor needs to find the ATM cell boundaries. In the prior art the hardware based delineation schemes then check every bit for cell delineation. The present invention solves this problem by checking bits based on an n-bit interval, by allowing a low performance RISC processor to delineate the ATM cells at high line rates.

An ATM cell consists of 424 bits and typically the starting bit of the data stream is called bit 0. Then the bit in the stream numbered 424×i (where i=0, 1, 2 etc) will also be an ATM boundary bit. To successfully delineate an ATM cell from an arbitrary bit position the RISC processor has to "hit" a boundary bit in a finite number of steps. By selecting n to be a length co-primal to the ATM cell length the maximum number of steps that will be needed to successfully "hit" an ATM boundary bit will be less than 424.

The co-primality can be achieved by calculating GCD (n, 424) if the GCD result is 1 then n is co-prime with 424. For the prior art n=1. By carefully calculating the value of n the cycle budget for the cell delineation can be matched to the RISC processor bandwidth. The number of cycles required to run the cell delineation algorithm is known, therefore the number of iterations (or steps) executed is programmable using the co-prime principle and GCD calculation.

For example if n=33, the cell delineation task will require only 3% of the RISC processor cycles that are required when checking bit by bit. It will be appreciated that the data size of the RISC processor is significant. For example a 16-bit machine can choose an n of 15 or 17 as 15 and 17 are both co-prime with 424. For a 32 bit machine 31 and 33 are the best options for n. It will be appreciated that for each size of machine there will be a number of different options for n. It will also be appreciated that sometimes the selection of n may be compromised to some extent in order to ease the implementation with respect to cycle budget availability.

Referring again to FIG. 4, the serial data stream 402 passes through the 32-bit register 204 of the RISC processor. As the data is passed through the RISC processor the serial data stream is checked after every n bits. The cyclic redundancy check (CRC) is calculated on each 32 bits and compared with the next eight bits of serial data in the stream 402. A series of shifts and logical OR functions manipulate the serial data stream in order to allow cell boundary checks to be carried out after n bits.

As has previously been indicated this invention is not just limited to ATM cell delineation schemes but may be used in any other system where a stream of packets need to be delineated. For example, it can be used to delineate fixed-length packets in a serial data stream such as fixed-length IP packets carrying 3G voice starting at arbitrary offsets within the frame.

It will be appreciated that the above described invention is not limited to the specific embodiment therein, it can include a number of alternatives that fall within the scope of the invention. For example, the length and type of cell, the nature of the algorithm, the manner in which the "skipping" is determined may be other than co-primality. Similarly as has been previously described when co-primality and GCD are used the value of n can be varied in accordance with the data bus width of the RISC processor, the size of the RISC processor registers and the required operating parameters of the RISC processor in a given system.

The invention claimed is:

1. A method of delineation of a packet-based data stream in order to identify a boundary between neighbouring packets in a data stream, wherein each packet comprises a predetermined number of bits (N); the method comprising:
    processing in a circuit the data stream to search for the boundary between neighbouring packets in the data stream;
    determining a bit skip integer (n) where (n) is greater than 1 and is co-primal to (N); and
    iteratively checking each n bits to identify the boundary between the neighbouring packets.

2. The method of claim 1, further comprising of identifying the boundary between two neighbouring packets by means of the iterative checking.

3. A method of claim 1, further comprising skipping n bits between each iterative step.

4. The method of claim 1, further comprising determining the value of n based on data bus width of a processor.

5. The method of claim 4, further comprising selecting n based on the processor performance.

6. The method of delineation of claim 1, wherein the method comprises delineation of a stream of ATM cells.

7. The method of claim 6, wherein said determining comprises calculating GCD (n, N), where N=424 for ATM cell delineation.

8. A device for delineating a packet-based stream of data so as to identify a boundary between neighbouring packets in the data stream, wherein each packet comprises a predetermined number of bits (N), the device comprising:
    an input configured to receive the data stream; and
    a processor adapted to iteratively check every $n^{th}$ bit within the data stream to determine the boundary, wherein n is greater than 1 and co-primal to (N) and n is determined based on the processor performance.

9. The device of claim 8, further comprising a means for identifying the boundary after the iterative check.

10. The device of claims 8, wherein the value of n based on data bus width of the processor.

11. The device of claim 8, wherein the method comprises delineation of a stream of ATM cells.

12. A computer program embodied in a tangible medium and comprising instructions, when executed on a computer system, for carrying out the steps of the method of claim 1.

13. A method of claim 2, further comprising skipping n bits between each iterative step.

14. The method of delineation of claim 2, wherein the method comprises delineation of a stream of ATM cells.

15. The method of delineation of claim 3, wherein the method comprises delineation of a stream of ATM cells.

16. The device of claim 10, wherein the method comprises delineation of a stream of ATM cells.

17. A method of delineation of a packet-based data stream in order to identify a boundary between packets in a data stream, wherein each packet comprises a predetermined number of bits (N); the method comprising:
    determining within a data processor a bit skip integer (n) based upon a data bus width of the data processor, where (n) is greater than 1 and is co-primal to (N); and
    iteratively checking in the data processor each n bits of the data stream to identify the boundary between the packets.

18. The method of claim 17, wherein (n) is further determined based upon the data processor performance.

19. The method of claim 17, wherein the method comprises delineation of a stream of ATM cells.

20. The method of claim 17, wherein said determining comprises calculating a greatest common denominator of (n) and 424.

* * * * *